(12) United States Patent
Gupta et al.

(10) Patent No.: US 11,445,836 B2
(45) Date of Patent: Sep. 20, 2022

(54) SHELVING ASSEMBLY OF A CONTAINER

(71) Applicant: TOSHIBA TEC KABUSHIKI KAISHA, Tokyo (JP)

(72) Inventors: Rahul Gupta, Bangalore (IN); Kathiresan Selvaraj, Bangalore (IN)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 457 days.

(21) Appl. No.: 16/582,255

(22) Filed: Sep. 25, 2019

(65) Prior Publication Data
US 2021/0022526 A1     Jan. 28, 2021

(30) Foreign Application Priority Data
Jul. 25, 2019 (IN) .............................. 201941030087

(51) Int. Cl.
| | |
|---|---|
| *A47F 3/02* | (2006.01) |
| *A47F 1/12* | (2006.01) |
| *G01G 21/28* | (2006.01) |
| *G01G 19/414* | (2006.01) |
| *G06Q 10/08* | (2012.01) |

(Continued)

(52) U.S. Cl.
CPC .................. *A47F 3/02* (2013.01); *A47F 1/12* (2013.01); *A47F 5/16* (2013.01); *A47F 7/0071* (2013.01); *A47F 10/02* (2013.01); *G01G 19/4144* (2013.01); *G01G 21/28* (2013.01); *G06Q 10/087* (2013.01); *A47B 51/00* (2013.01); *A47F 2010/025* (2013.01)

(58) Field of Classification Search
CPC ...... G01G 19/4144; G01G 21/28; A47F 3/02; A47F 1/12; A47F 5/16; A47F 7/071; A47F 10/02; A47F 2010/025; G06Q 10/087; A47B 51/00
See application file for complete search history.

(56) References Cited

U.S. PATENT DOCUMENTS

| | | | | |
|---|---|---|---|---|
| 4,917,198 A | * | 4/1990 | Sing ........................ | G01G 5/06 177/208 |
| 4,932,488 A | * | 6/1990 | Tsay ..................... | G01G 11/003 177/238 |

(Continued)

OTHER PUBLICATIONS

FIFO Storage Rack System: http://www.materialhandlingautomation.com/fifo-storage-rack-system.html 2012, pp. 1-22, Retrieved on Sep. 24, 2019.

*Primary Examiner* — Randy W Gibson
(74) *Attorney, Agent, or Firm* — Foley & Lardner LLP

(57) ABSTRACT

A shelving assembly is provided for a container. The shelving assembly includes a first shelf movably positioned in the container and configured to support a first stock. The shelving assembly further includes a plurality of first support members configured to support the first shelf and displace the first shelf between a first position and a second position in the container based on a weight sensed by at least one first weight sensor to maintain the first stock at an opening of the container. Additionally, the shelving assembly includes a second shelf positioned adjacent within the container and configured to support a second stock. The first shelf is configured to be removed at the second position to facilitate the first stock descending onto the second stock on the second shelf. Accordingly, the shelving assembly facilitates first in first out stock rotation.

17 Claims, 5 Drawing Sheets

(51) Int. Cl.
*A47F 10/02* (2006.01)
*A47F 5/16* (2006.01)
*A47F 7/00* (2006.01)
*A47B 51/00* (2006.01)

(56) References Cited

U.S. PATENT DOCUMENTS

| | | | | |
|---|---|---|---|---|
| 5,256,835 A | * | 10/1993 | Rydzak | G01G 19/005 177/25.15 |
| 5,914,464 A | * | 6/1999 | Vogel | G01G 19/005 177/180 |
| 2018/0271281 A1 | * | 9/2018 | Bryan | A47F 3/06 |
| 2021/0177162 A1 | * | 6/2021 | Tovey | A47B 63/065 |

* cited by examiner

SHELVING ASSEMBLY OF A CONTAINER

CROSS-REFERENCE TO RELATED APPLICATION

This application is based upon and claims the benefit of priority from Indian Patent Application No. 201941030087, filed Jul. 25, 2019, the entire contents of which are incorporated herein by reference.

TECHNICAL FIELD

The present disclosure generally relates to a field of retail packaging and display. Particularly, but not exclusively the present disclosure relates to a shelving assembly for displaying stock in a retail set-up. Further embodiments of the present disclosure disclose a shelving assembly for first in first out (FIFO) stock rotation that is configured to maintain the stock at an opening or brim of a storage container.

BACKGROUND

Perishable goods such as fruits, vegetables and the like have a short shelf-life. Due to their short shelf-life, such perishable goods are to be consumed immediately. In retail stores, consumers generally tend to buy or pick freshly arrived goods rather than older goods, especially for perishable goods. Such tendencies make the consumer to always aim to pick freshly stocked goods, even though the older goods are still fresh and edible for consumption. These attitudes or tendencies of the consumers lead to substantial wastage of goods, stock being piled up or abandoned, deterioration, and losses, which may be undesirable.

Several attempts have been made to adapt to such attitude and tendencies of the customers to improve sales and also minimize wastage of the goods (referred to herein as stock). One such attempt may be stacking of the storage compartments (i.e., containers or bins) up to an opening (i.e., brim) and maintaining the stock always at the brim. Maintaining the stock at the brim of the storage compartment may create an impression to the consumers that the goods are fresh (i.e., newly arrived or stocked). Further, in order to avoid wastage of the stock during the process of maintaining the stock up to the brim of the storage compartment, the stock may be rotated in such a way that the older stock in the storage compartment is first evacuated. Further, fresh stock is introduced into the storage compartment, above which the older stock is piled up to the brim of the storage compartment. This facilitates the older stock being picked up or sold first, followed by the fresh stock, resulting in effective stock management. However, this technique of managing the inventory (i.e., maintaining the stock always up to brim of the storage compartment and rotating the stock during re-stocking) solely depends on the skill set and behavior of the operator. Hence, this method may not always be a viable option in various retail stores.

Further, due to basic human tendency or attitude, the operator may fail to maintain the stock the brim of the storage compartment or may fail to rotate the stock during restocking. This may directly affect the sales of the stock and may also lead to wastage of the stock, which is undesired. Also, it may not be feasible to maintain the stock at the brim of the storage compartment by an operator for small reduction in quantity of the stock in the storage compartment.

The present disclosure is directed to overcoming one or more limitations stated above or any other limitations associated with the conventional arts.

SUMMARY

One or more shortcomings of the conventional arts are overcome and additional advantages are provided through the present disclosure. Additional features and advantages are realized through the techniques of the present disclosure. Other embodiments and aspects of the disclosure are described in detail herein and are considered a part of the claimed disclosure.

In a non-limiting embodiment of the disclosure, a shelving assembly for a container is disclosed. The shelving assembly comprises a first shelf, which is movably positioned within the container. An upper surface of the first shelf is configured to accommodate and support a first stock. Further, the shelving assembly comprises a plurality of first support members. The plurality of first support members are configured to support the first shelf and displace the first shelf between a first position and a second position in the container. The plurality of first support members displace the first shelf based on a weight of the stock sensed by at least one first weight sensor to maintain the first stock at an opening of the container, including when a portion of the first stock is removed.

In an embodiment, the shelving assembly comprises a second shelf movably positioned within the container, which may be adjacent to the first stock. An upper surface of the second shelf is configured to support a second stock.

In an embodiment, the shelving assembly comprises a plurality of second support members. The plurality of support members are configured to support the second shelf and displace the second shelf between the first position and the second position in the container based on a weight of the second stock sensed by at least one second weight sensor.

In an embodiment, the shelving comprises a control unit. The control unit is configured to actuate the plurality of first support members based on the weight of the first stock sensed by the at least one first weight sensor. The control unit is configured to actuate the plurality of second support members based on the weight of the second stock sensed by the at least one second weight sensor.

In an embodiment, the first shelf is configured to be removable at the second position to facilitate the first stock descending onto the second stock on the second shelf. The second shelf is configured to displace the first stock in an upward direction when moved from the first position toward the second position to maintain the first stock at the opening of the container.

In an embodiment, after the first shelf is removed from the container at the second position, the first shelf is configured to be re-insertable into the container below the second shelf to support a third stock within the container.

In an embodiment, the shelving assembly comprises a first stopper and a second stopper. The first stopper is configured to prevent displacement of the first shelf and the second shelf below the first position. The second stopper is configured to prevent displacement of the first shelf and the second shelf above the second position.

In an embodiment, the shelving assembly comprises at least one sensor associated with the second stopper and configured to determine if at least one of the first shelf or the second shelf have reached the second position.

In an embodiment, the shelving assembly comprises a plurality of clamps. One or more of the clamps is coupled to at least one of (a) one of the first support members and (b) one of the second support members. Each clamp is configured to support at least one of (a) a lower surface of the first shelf or (b) a lower surface of the second shelf.

In an embodiment, the plurality of first and second support members include at least one of a hydraulic actuator, electric actuator, or a pneumatic actuator.

In an embodiment, the plurality of first support member includes a conveyor belt.

In an embodiment, the plurality of first support members include roller drives configured to drive the conveyor belt.

In an embodiment, the plurality of first support members are configured to displace the first shelf in a forward direction between the first position and the second position based on the weight of the first stock sensed by the at least one first weight sensor to maintain the first stock at the opening of the container.

In another non-limiting embodiment of the disclosure, a container assembly comprises a container defining an opening and a shelving assembly coupled to the container. The shelving assembly comprises a first shelf movably coupled to the container and having an upper surface configured to support a plurality of first products. The shelving assembly further comprises a plurality of first support members configured to move the upper surface of the first shelf between a first position and a second position. The plurality of first support members are configured to move the upper surface of the first shelf toward the opening in response to a decrease in a weight supported by the first shelf.

In an embodiment, the shelving assembly comprises a second shelf movably coupled to the container and having an upper surface configured to support a plurality of second products.

In an embodiment, the shelving assembly comprises a plurality of second support members configured to move the second shelf between the first position and the second position. The plurality of second support members are configured to move the upper surface of the second shelf toward the opening in response to a decrease in a weight supported by the second shelf.

In an embodiment, the container includes a series of walls defining a plurality of grooves, and each of the grooves receives at least one of (a) at least one of the first support members or (b) at least one of the second support members.

In an embodiment, the container assembly comprises a door pivotally coupled to the container, wherein the door is operable to facilitate access to the first shelf and the second shelf for loading the first products and the second products.

In another non-limiting embodiment of the disclosure, a method of operating a shelving assembly of a container comprises determining, by a first weight sensor, an amount of weight supported by a first shelf and in response to a determination that the amount of weight supported by the first shelf has decreased, moving the first shelf from a first position toward a second position. A distance between the first position and an opening of the container is greater than a distance between the second position and the opening of the container.

In an embodiment, the method comprises determining, by a second weight sensor, an amount of weight supported by a second shelf and, in response to a determination that the amount of weight supported by the second shelf has decreased, raising the second shelf from the first position toward the second position.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The accompanying drawings, which are incorporated in and constitute a part of this disclosure, illustrate exemplary embodiments and, together with the description, serve to explain the disclosed principles. The same numbers are used throughout the figures to reference like features and components. Some embodiments of device and/or methods in accordance with embodiments of the present subject matter are now described, by way of example only, and with reference to the accompanying figures, in which.

Figure 1:
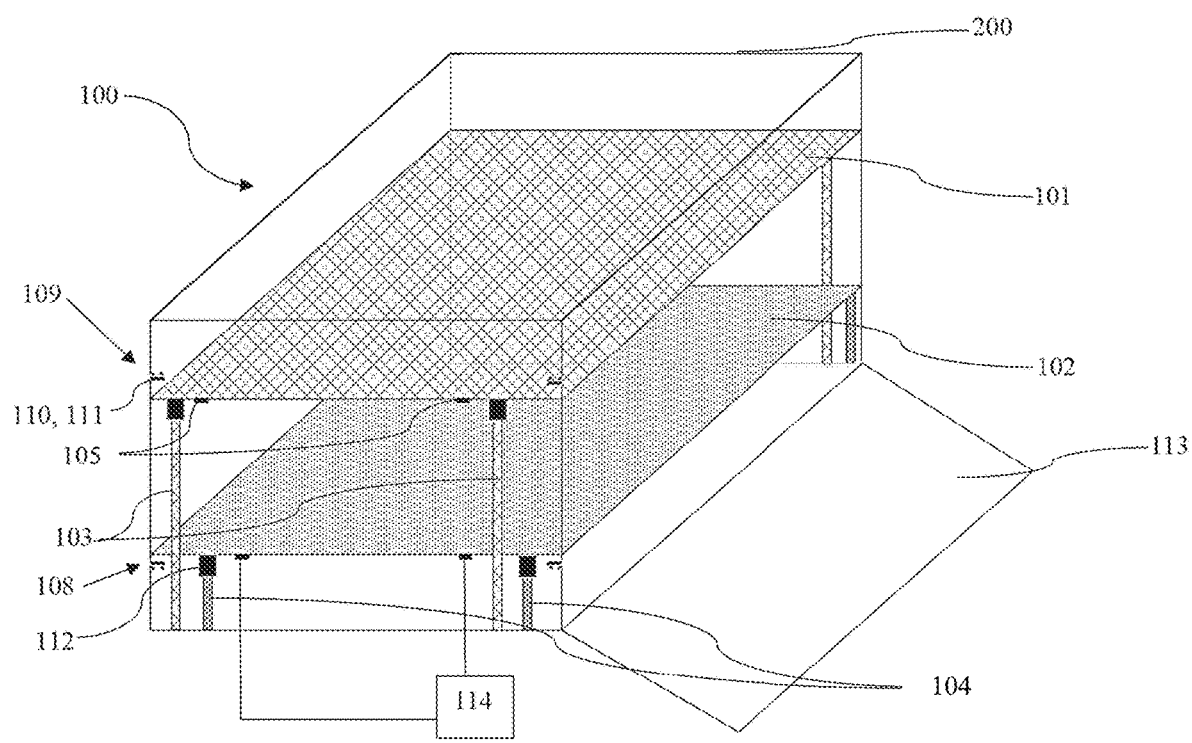
FIG. 1 illustrates a schematic perspective view of a shelving assembly of a container, in accordance with some embodiments of the present disclosure.

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiments thereof has been shown by way of example in the drawings and will be described in detail below. It should be understood, however that it is not intended to limit the disclosure to the particular forms disclosed, but on the contrary, the disclosure is to cover all modifications, equivalents, and alternatives falling within the spirit and the scope of the disclosure.

The terms "comprises," "comprising," or any other variations thereof, are intended to cover a non-exclusive inclusion, such that a device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

Embodiments of the present disclosure disclose a shelving assembly of a container. Generally, perishable food products (referred to herein as stock) have a limited shelf-life. Due to intense competition in the present marketing world, shelves or storage compartments are stacked up to an opening (thus, brim). This creates an impression of a fresh stock being stacked in the container, and thus attracts consumers. Since refilling the stock up to the brim of the storage compartment is carried out manually, it solely depends on behavior and mind set of the operator. However, maintaining the stock always at the brim of the container may result in the older stock piled up at the base of the container and fresh stock above the older stock, due to inappropriate rotation of the stock by the operator. This may lead to wastage of the stock, which is undesired in the marketing sector. Hence, in order to accomplish first in first out (FIFO) stock rotation and to maintain the stock at the brim or opening of the container independent of human behavior, the shelving assembly of the present disclosure may be adapted.

The shelving assembly of a container comprises a first shelf, which may be movably positioned within the container. Further, the shelving assembly comprises a plurality of first support members. The plurality of first support members may support a lower surface of the first shelf. The plurality of first support members may be configured to displace the first shelf between a first position and a second position in the container to maintain the stock at the brim or opening of the container. In an embodiment, the plurality of first support members displace the first shelf based on a weight of the stock on the first shelf, which is measured by one or more weight sensors.

In some embodiments, the shelving assembly may comprise a second shelf. The second shelf may be movably positioned within the container, adjacent to the first shelf, and may be configured to accommodate the stock. The second shelf may be supported by a plurality of second support members. The plurality of support members may be configured to displace the second shelf between the first position and the second position in the container based on a weight of the stock on the second shelf sensed by the one or more weight sensors. In an embodiment, the first shelf may be configured to be removable at the second position, such that the stock in the first shelf descends onto the stock in the second shelf to facilitate first in first out stock rotation. Upon removal of the first shelf from the container, the second shelf may displace between the first position and the second position to maintain the stock at the brim of the container. Further, the first shelf removed from the container may be configured to be re-inserted into the container at the first position, and thus may facilitate in accommodating fresh stock during displacement of the second shelf between the first position and the second position. In an embodiment, the second shelf may be configured to be removable from the container at the second position and re-insertable into the container at the first position. This cycle of removing and re-insertion of the first shelf and the second shelf may be continued to maintain the stock at the brim of the container and to ensure first in first out stock rotation.

In another embodiment, the first shelf may be configured as a conveyor belt. The conveyor belt may be supported by a plurality of first support members such as roller drives. The plurality of first support members may facilitate displacing the first shelf (i.e., the conveyor belt) in a forward direction between the first position and the second position. The conveyor belt displaces in a forward direction, based on a weight sensed by the one or more weight sensors associated with the conveyor belt. This configuration facilitates in maintaining the stock at the opening of the container and also facilitates first in first out stock rotation.

In the following detailed description, embodiments of the disclosure are explained with reference of accompanying figures that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 2:
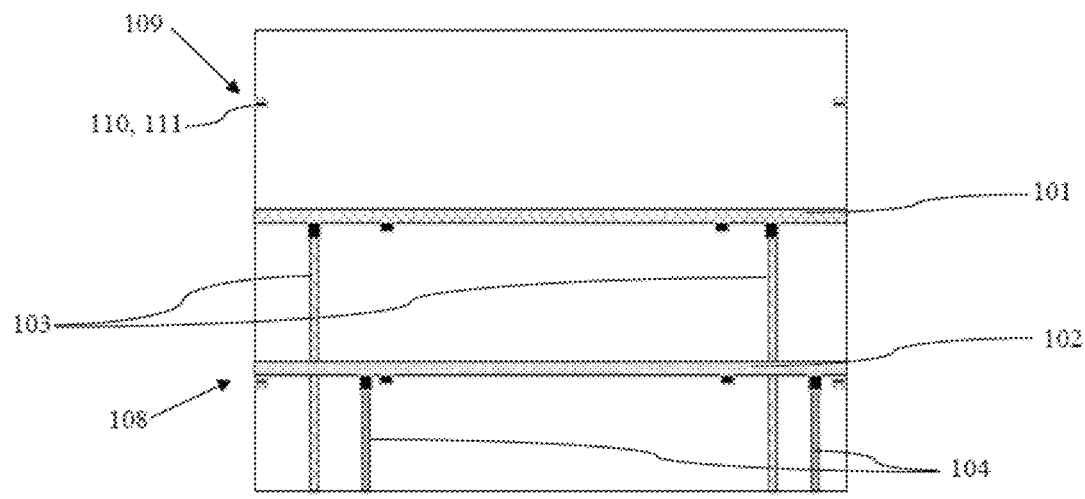
FIG. 2 illustrates a side view of the shelving assembly of the container of FIG. 1.

FIGS. 1 and 2 illustrate a schematic perspective view and a side view of a shelving assembly (100) of a container (200), respectively, in accordance with some embodiments of the present disclosure.

Figure 3:
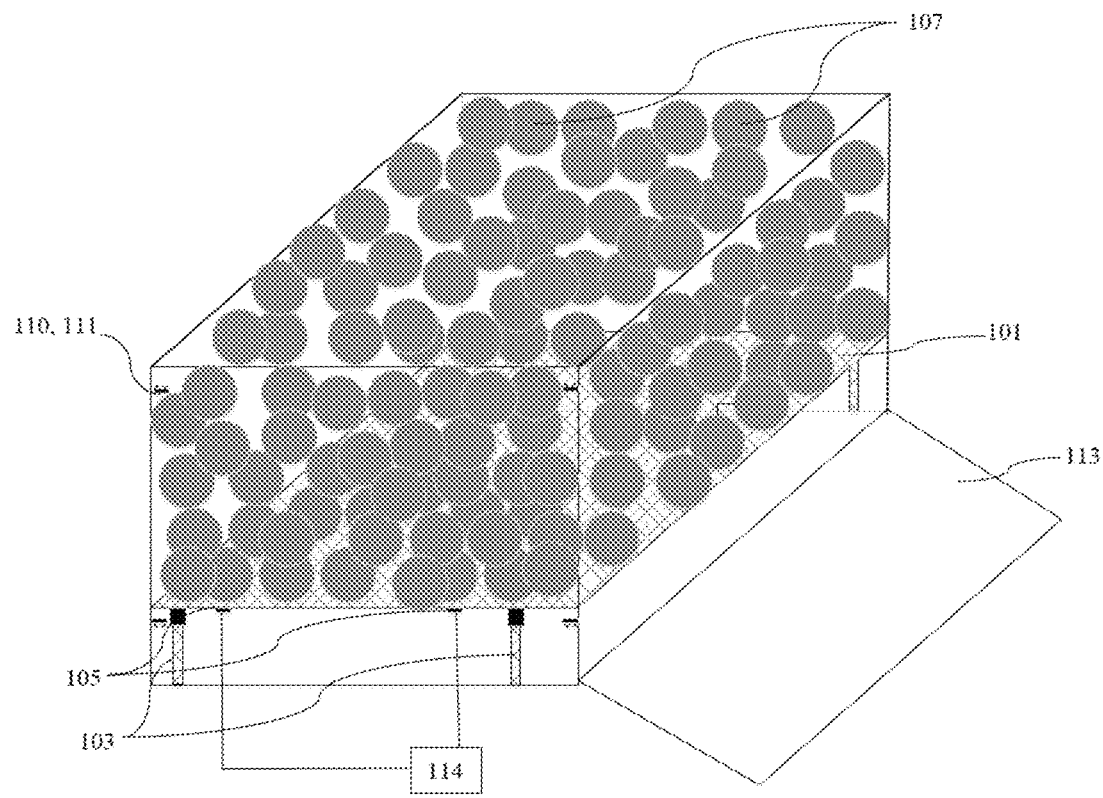
FIG. 3 illustrates a perspective view of the shelving assembly of the FIG. 1 with stock loaded on a first shelf.

As shown in FIGS. 1 and 2, the shelving assembly (100) comprises a first shelf (101), which may be movably positioned within the container (200). In an embodiment, an upper surface of the first shelf (101) may be configured to accommodate a stock (107) (e.g., as seen in FIG. 3). Further, the shelving assembly (100) comprises a plurality of first support members (103). The plurality of first support members (103) may be configured to support a lower surface of the first shelf (101). Further, the plurality of first support members (103) may displace the first shelf (101) between a first position (108) and a second position (109) in the container (200) to maintain the stock (107) at an opening (thus, brim) of the container (200). In an embodiment, the plurality of first support members (103) displace the first shelf (101) between the first position (108) and the second position (109) based on weight of the stock (107), sensed by one or more weight sensors (105) associated with the first shelf (101). Furthermore, the shelving assembly (100) may comprise a second shelf (102). The second shelf (102) may be movably positioned adjacent to the first shelf (101). As an example, the second shelf (102) may be positioned below the first shelf (101). However, this may not be considered as a limitation, since during stock rotation, both the first shelf (101) and the second shelf (102) toggle between the first position (108) and the second position (109).

In an embodiment, an upper surface of the second shelf (102) may be configured to accommodate the stock (107). Additionally, the shelving assembly (100) comprises a plurality of second support members (104), which may be configured to support a lower surface of the second shelf (102). Also, the plurality of second support members (104) may be configured to displace the second shelf (102) between the first position (108) and the second position (109) within the container (200). The plurality of second support members (104) displaces the second shelf (102) between the first position (108) and the second position (109) based on weight of the stock (107) sensed by the one or more weight sensors (105) associated with the second shelf (102). In an embodiment, the plurality of first support members (103) and the second support members (104) may be accommodated in a plurality of grooves defined in walls of the container (200). In an embodiment, the plurality of first support members (103) and the plurality second support members (104), may not be construed as a limitation, as any number of support members may be provided in the shelving assembly (100) depending upon number of shelves.

In an embodiment, an end of each of the plurality of first support members (103) and the second support members (104) may comprise a clamp (112). The clamp (112) may facilitate in supporting a lower surface of the first shelf (101) and the second shelf (102). In an embodiment, the plurality of first support members (103) and the plurality of second support members (104) may be or include a hydraulic actuator, an electric actuator, and/or a pneumatic actuator.

In an embodiment, the first support members (103) and the second support members (104) may be or include a helical spring, which may displace the first shelf (101) and the second shelf (102), based on weight of the stock in the first shelf (101) and the second shelf (102).

Additionally, the shelving assembly (100) comprises a stopper (110). The stopper (110) may facilitate in arresting displacement of the first shelf (101) and the second shelf (102) beyond the first position (108) and the second position (109). In an embodiment, the stopper (110) at the second position (109) may be associated with a plurality of sensors (111) configured to determine when the first shelf (101) and the second shelf (102) have displaced to the second position (109). The plurality of sensors (111) may be internet of things (IOT) based sensors, which may facilitate instructing the operator to remove the corresponding shelf [i.e., either of the first shelf (101) and the second shelf (102)] upon displacing to the second position (109).

In an embodiment, the shelving assembly (100) may include a control unit (114). The control unit (114) may be configured to actuate the plurality of first support members (103) and the second support members (104) to displace the first shelf (101) and the second shelf (102), based on the weight sensed by the one or more weight sensors (105).

In an embodiment, the shelving assembly (100) comprising the first shelf (101) and the second shelf (102) may not be construed as a limitation, as the shelving assembly (100) may comprise a plurality of shelves, based on the requirement.

FIG. 3 illustrates an operational embodiment of the shelving assembly (100). In the illustrated embodiment, the first shelf (101) is positioned at a first position (108) in the container (200). The upper surface of the first shelf (101) may be loaded with the stock (107). In an embodiment, the first shelf (101) may be accessed by a door (113), to load the stock (107). In another embodiment, the stock (107) may be loaded onto the first shelf (101) from top of the container (200) through an opening from top of the container (200). Once, the first shelf (101) is accommodated with the stock (107), the first shelf (101) may displace between the first position (108) and the second position (109).

Figure 4:
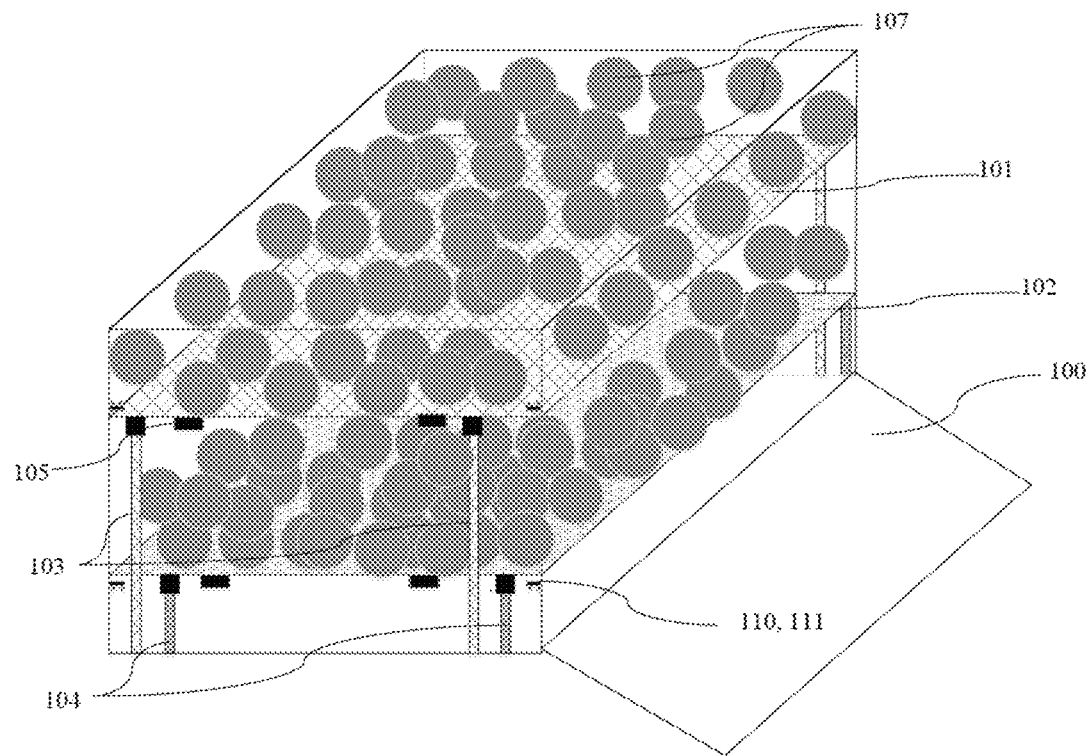
FIG. 4 illustrates a perspective view of the shelving assembly of the FIG. 1 with the stock loaded on a second shelf at a first position, and the first shelf at a second position.

Now referring FIG. 4 in conjunction with FIG. 3, unloading of the stock (107) (i.e., the stock being picked by the consumer) from the first shelf (101) is illustrated. During unloading (removal) of the stock from the first shelf (101), the plurality of first support members (103) displace the first shelf (101) in an upward direction from the first position (108) [i.e., towards the second position (109)], in order to maintain the stock (107) at the opening of the container (200). In an embodiment, the plurality of first support members (103) may displace the first shelf (101) from the first position (108) [thus, towards the second position (109)], based on weight sensed by the one or more weight sensors (105), in order to maintain the stock (107) at the opening of the container (200). As seen in FIG. 4, once the first shelf (101) is displaced from the first position (108), the second shelf (102) may be inserted adjacent (i.e., below) the first shelf (101) in the container (200). This, facilitates in loading the stock (107) from the bottom of the container to aid first in first out stock (107) rotation.

Figure 5:
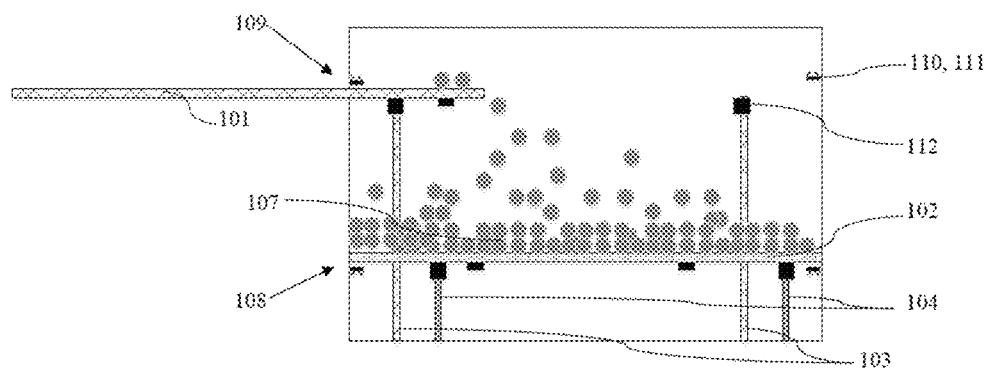
FIG. 5 illustrates a side view of the shelving assembly of FIG. 1 with the first shelf removed from the container, in accordance with some embodiments of the present disclosure.

As seen in FIG. 5, the first shelf (101) displaces to the second position (109), the plurality of IOT based sensors (111) may indicate to the operator when the first shelf (101) has reached the second position (109). This enables the operator to timely remove the first shelf (101) from the container (200) in order to expose the stock (107) [thus, the fresh stock, which is loaded in the second shelf (102)]. Further, during removal of the first shelf (101) from the container (200), the stock (107) (i.e., leftover/old stock in first shelf (101)), may descend onto the stock (107) in the second shelf (102). This facilitates the stock (107) from the first shelf (101)[i.e., leftover/old stock] dropping down onto the fresh stock (107) loaded in the second shelf (102), such that the stock (107) which was previously available on the first shelf (101) is available on top of the fresh stock (107) in the second shelf (102). This facilitates rotating the stock (107) in a first in first out manner.

Figure 6:
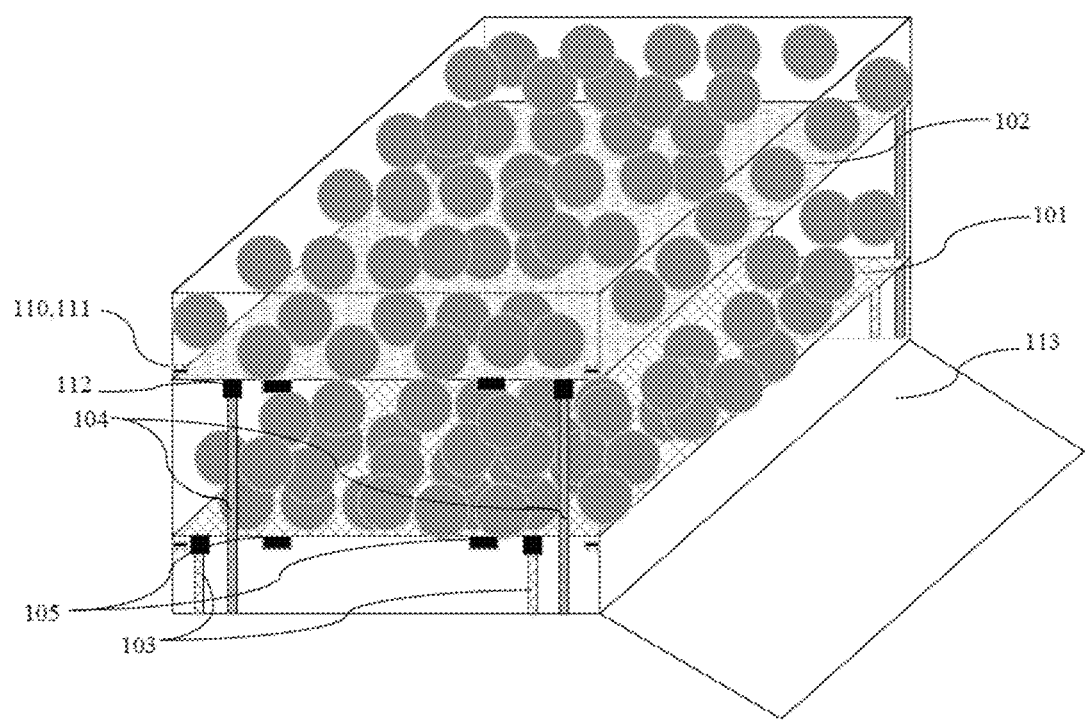
FIG. 6 illustrates a perspective view of the shelving assembly of FIG. 1 with the second shelf at a second position and the first shelf re-inserted at the first position.

In an embodiment, once the first shelf (101) is removed from the container (200) (e.g., as seen in FIG. 5), the second shelf (102) may be configured to move away from the first position (108) based on the weight of the stock (107) in the second shelf (102) to position or maintain the stock (107) at the opening of the container (200). As the stock is unloaded, the weight of the stock on the shelf is reduced. As the amount of stock (107) in the second shelf (102) is reduced (e.g., stock (107) is picked by the consumers, such that a portion of the stock is removed), the second shelf (102) displaces towards the second position (109) in order to position or maintain the stock (107) at the opening of the container (200). In an embodiment, as seen in FIG. 6, the first shelf (101) that has been removed from the container (200) may be re-inserted into the container (200) at the first position (108) below the second shelf (102). The first shelf (101) may thus, facilitate in accommodating the stock (107), during displacement of the second shelf (102). In an embodiment, before re-insertion of the first shelf (101) at the first position (108), the plurality of first support members (103) that were extended up to the second position (109) are moved to the first position (108) in order to support the first shelf (101) at the first position (108) in the container (200).

In an embodiment, during displacement of the first shelf (101) between the first position (108) and the second position (109), the second shelf (102) may be locked at the first position (108) using suitable clips. During displacement of the second shelf (102) between the first position (108) and the second position (109), the first shelf (101) may be locked at the first position (108) using suitable clips.

In an embodiment, locking one of the first shelf (101) and the second shelf (102) at the first position (108) may not be construed as a limitation, as one or more shelves may be displaced simultaneously without deviating from the scope of the present disclosure.

Figure 7:
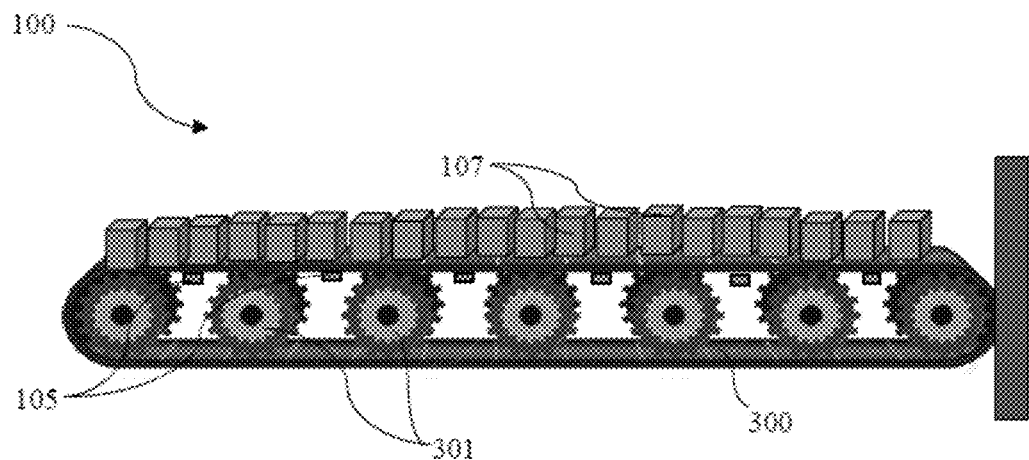
FIG. 7 illustrates a perspective view of a first shelf configured as a conveyor assembly in accordance with another embodiment of the present disclosure.
Figure 8A:
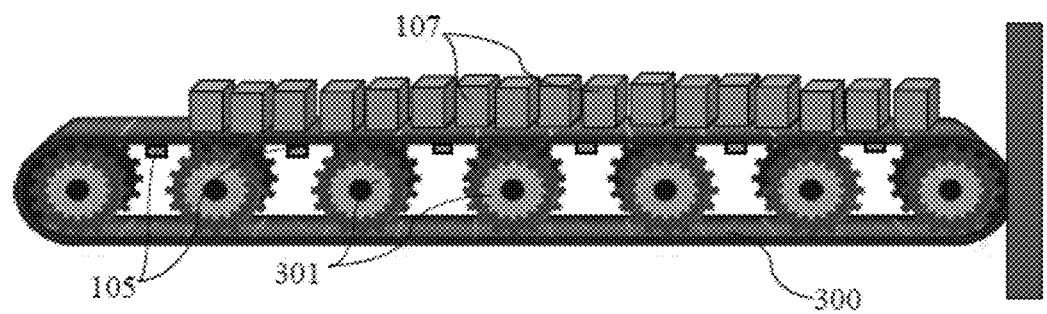
FIG. 8A illustrates a perspective view of the first shelf of FIG. 7 with the stock depleted in one section of the first shelf.
Figure 8B:
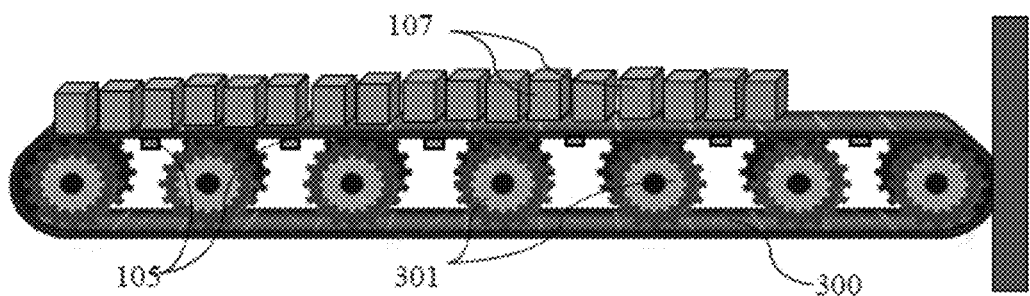
FIG. 8B illustrates a perspective view of the first shelf of FIG. 7 with one section of the first shelf available for loading the stock.

Now referring to FIG. 7, which illustrates a first shelf (101) configured as a conveyor belt (300) in accordance with another embodiment of the present disclosure. As apparent from FIG. 7, the conveyor belt may be supported by a plurality of first support members (301). As an example, the plurality of first support members may be roller drives. In an embodiment, the conveyor belt (300) may be divided into a number of sections along a length of the conveyor belt (300). Each section of the plurality of sections of the conveyor belt (300) may be configured to accommodate the stock (107). Each section of the plurality of sections may be associated with one or more weight sensors (105). Based on the weight sensed by the one or more weight sensors (105), the plurality of first support members (103) may displace the conveyor belt (300) (thus, the first shelf) in a forward direction. As apparent in FIG. 8A, upon emptying or reduction in quantity of the stock (107) in the first section of the conveyor belt, the one or more weight sensors (105) may send a signal to the plurality of first support members (103) to actuate the conveyor belt to displace in a forward direction such that the section loaded with the stock (107) is maintained or otherwise positioned at an opening or in reach to the consumer. Further, as the section with the stock (107) is displaced to the front end, the stock (107) may be loaded on the section at an end of the conveyor belt (300) (e.g., as seen in FIG. 8B). This configuration of loading the stock (107) at the end section of the conveyor belt (300) may facilitate first in first out stock (107) rotation and maintaining the stock (107) at the opening.

In an embodiment, the conveyor belt acting as a first shelf (101) may be positioned within the container (200), in order to maintain the stock (107) at an opening of the container (200) (i.e., brim), and to facilitate first in first out stock (107) rotation.

In an embodiment, the shelving assembly (100) of the present disclosure facilitates in maintaining the stock at the opening of the container automatically based on weight of the stock in the shelf.

In an embodiment, loading the stock on to the shelf from the bottom of the container facilitates in first in first out (FIFO) stock rotation.

REFERENCE NUMERALS

| Reference Number | Description |
| --- | --- |
| 100 | Shelving assembly |
| 101 | First shelf |
| 102 | Second shelf |
| 103 | First support members |
| 104 | Second support members |
| 105 | One or more weight sensors |
| 107 | Stock |
| 108 | First position |
| 109 | Second position |
| 110 | Stopper |
| 111 | One or more sensors |
| 112 | Clamp |
| 113 | Door |
| 114 | Control unit |
| 200 | Container |
| 300 | Conveyor belt |
| 301 | Roller drives |

What is claimed is:

1. A shelving assembly for a container, the shelving assembly comprising:
    a first shelf movably positioned within the container, wherein an upper surface of the first shelf is configured to support a first stock;
    a second shelf movably positioned within the container, wherein an upper surface of the second shelf is configured to support a second stock; and
    a plurality of first support members configured to support the first shelf,
    wherein the plurality of first support members are configured to displace the first shelf between a first position and a second position in the container based on a weight of the first stock sensed by at least one first weight sensor to position the first stock at an opening of the container when a portion of the first stock is removed.

2. The shelving assembly of claim 1, further comprising a plurality of second support members configured to support the second shelf, wherein the plurality of second support members are configured to displace the second shelf between the first position and the second position in the container based on a weight of the second stock sensed by at least one second weight sensor.

3. The shelving assembly of claim 2, further comprising a control unit configured to:
    actuate the plurality of first support members based on the weight of the first stock sensed by the at least one first weight sensor; and
    actuate the plurality of second support members based on the weight of the second stock sensed by the at least one second weight sensor.

4. The shelving assembly of claim 2, wherein the first shelf is configured to be removable at the second position to facilitate the first stock descending onto the second stock on the second shelf, and wherein the second shelf is configured to displace the first stock in an upward direction when moved from the first position toward the second position to position the first stock at the opening of the container.

5. The shelving assembly of claim 4, wherein after the first shelf is removed from the container at the second position, the first shelf is configured to be re-insertable into the container below the second shelf to support a third stock within the container.

6. The shelving assembly of claim 2, further comprising:
    a first stopper configured to prevent displacement of the first shelf and the second shelf below the first position; and
    a second stopper configured to prevent displacement of the first shelf and the second shelf above the second position.

7. The shelving assembly of claim 6, further comprising at least one sensor associated with the second stopper and configured to determine whether at least one of the first shelf or the second shelf has reached the second position.

8. The shelving assembly of claim 2, further comprising a plurality of clamps, wherein one or more of the clamps is (1) coupled to at least one of (a) one of the first support members or (b) one of the second support members, and (2) configured to support at least one of (a) a lower surface of the first shelf or (b) a lower surface of the second shelf.

9. The shelving assembly of claim 2, wherein the plurality of first support members and the plurality of second support members include at least one of a hydraulic actuator, an electric actuator, or a pneumatic actuator.

10. The shelving assembly of claim 1, wherein the first shelf includes a conveyor belt.

11. The shelving assembly of claim 10, wherein the plurality of first support members include roller drives configured to drive the conveyor belt.

12. The shelving assembly of claim 11, wherein the plurality of first support members are configured to displace the first shelf in a forward direction between the first position and the second position based on the weight of the first stock sensed by the at least one first weight sensor to position the first stock at the opening of the container.

13. A container assembly, comprising:
    a container defining an opening; and
    a shelving assembly coupled to the container, the shelving assembly comprising:

a first shelf movably coupled to the container and having an upper surface configured to support a plurality of first products;

a second shelf movably coupled to the container and having an upper surface configured to support a plurality of second products; and a plurality of first support members configured to move the upper surface of the first shelf between a first position and a second position, wherein the plurality of first support members are configured to move the upper surface of the first shelf toward the opening in response to a decrease in a weight supported by the first shelf.

14. The container assembly of claim 13, further comprising a plurality of second support members configured to move the second shelf between the first position and the second position, wherein the plurality of second support members are configured to move the upper surface of the second shelf toward the opening in response to a decrease in a weight supported by the second shelf.

15. The container assembly of claim 14, wherein the container includes a series of walls defining a plurality of grooves, and wherein each of the grooves receives at least one of (a) at least one of the first support members or (b) at least one of the second support members.

16. The container assembly of claim 13, further comprising a door pivotally coupled to the container, wherein the door is operable to facilitate access to the first shelf and the second shelf for loading the first products and the second products.

17. A method of operating a shelving assembly of a container, comprising:

determining, by a first weight sensor, an amount of weight supported by a first shelf;

in response to a determination that the amount of weight supported by the first shelf has decreased, moving the first shelf from a first position toward a second position, wherein a distance between the first position and an opening of the container is greater than a distance between the second position and the opening of the container;

determining, by a second weight sensor, an amount of weight supported by a second shelf; and in response to a determination that the amount of weight supported by the second shelf has decreased, raising the second shelf from the first position toward the second position.

* * * * *